United States Patent [19]

Molloy et al.

[11] 4,106,985

[45] Aug. 15, 1978

[54] FUEL ELEMENT FOR A NUCLEAR REACTOR

[75] Inventors: Joseph Molloy, Deal, England; William G. Clarke, Monroeville, Pa.

[73] Assignee: Westinghouse Electric Corp., Pittsburgh, Pa.

[21] Appl. No.: 717,077

[22] Filed: Aug. 24, 1976

[51] Int. Cl.² .............................................. G21C 3/16
[52] U.S. Cl. ..................................................... 176/68
[58] Field of Search ..................................... 176/68, 80

[56] References Cited

U.S. PATENT DOCUMENTS

| B.396,164 | 2/1976 | Wehrli et al. | 176/68 |
|---|---|---|---|
| 3,157,580 | 11/1964 | Williams | 176/68 |
| 3,291,698 | 12/1966 | Fortescue | 176/68 |
| 3,647,622 | 3/1972 | Andrews et al. | 176/68 |
| 3,647,623 | 3/1972 | Hepps et al. | 176/68 |
| 3,700,553 | 10/1972 | Malang | 176/68 |
| 3,813,287 | 5/1974 | Malang | 176/68 |
| 3,899,392 | 8/1975 | Grossman et al. | 176/68 |
| 3,964,967 | 4/1976 | Nelson | 176/80 |

FOREIGN PATENT DOCUMENTS

| 950,134 | 6/1974 | Canada | 176/68 |
|---|---|---|---|
| 43-875 | 1/1968 | Japan | 176/68 |
| 7,003,343 | 9/1970 | Netherlands | 176/68 |

*Primary Examiner*—Harvey E. Behrend
*Attorney, Agent, or Firm*—L. A. DePaul; Z. L. Dermer

[57] ABSTRACT

A fuel element for nuclear reactors which has therein a bellows-like member surrounded by a filling gas. The bellows-like member contains a substance such as water or a mixture of water and gas that attains substantially the same temperature as the environment external to the fuel element. In response to temperature changes of the environment and pressure changes of the filling gas, the substance in the bellows-like member causes the bellows-like member to expand or contract thereby causing the internal fuel element pressure to be substantially equal to the pressure of the environment external to the fuel element.

2 Claims, 3 Drawing Figures

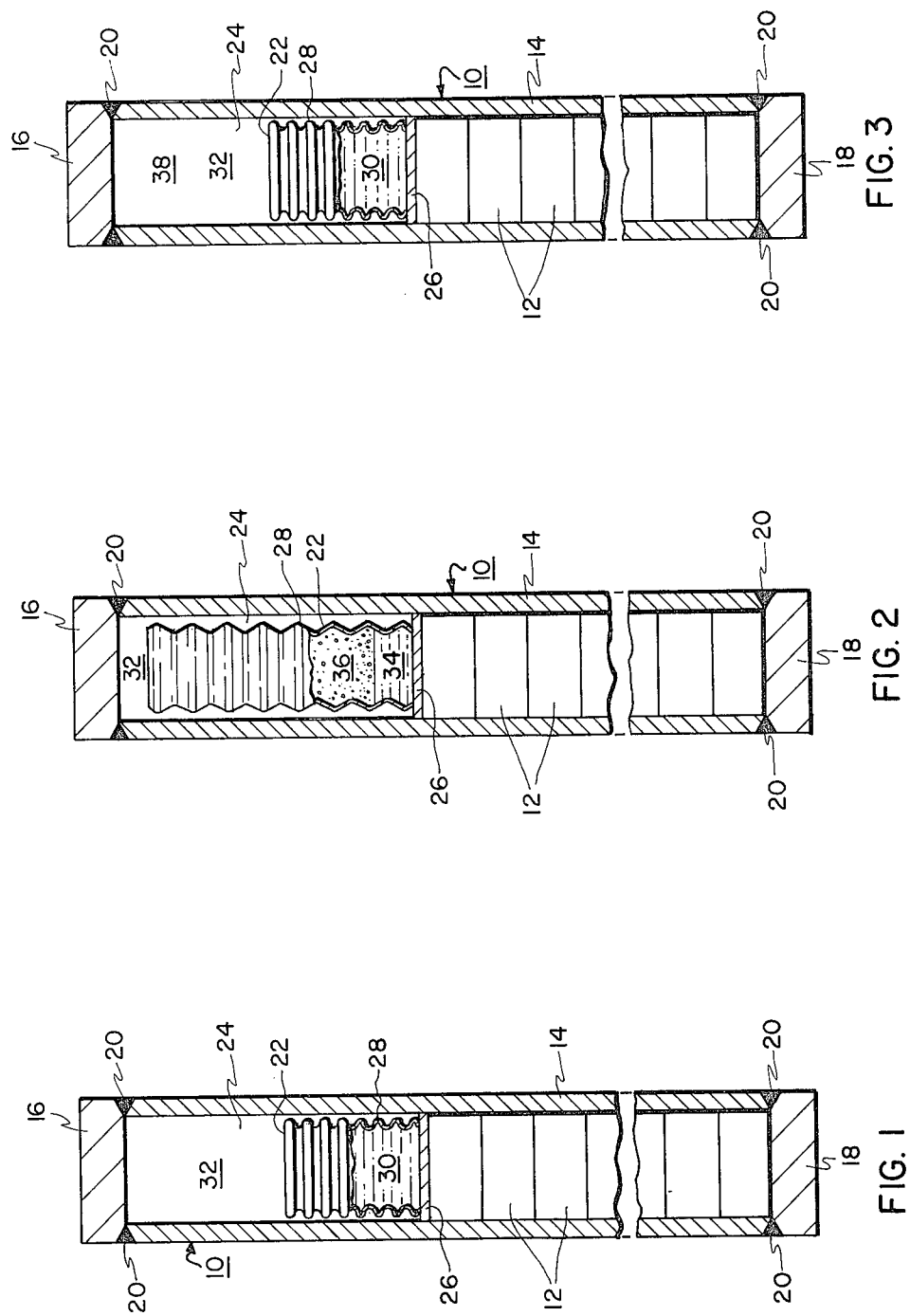

FUEL ELEMENT FOR A NUCLEAR REACTOR

BACKGROUND OF THE INVENTION

This invention relates to fuel elements, and more particularly to fuel elements which are subject to internal pressure buildup during operation.

In many designs of nuclear reactors, the reactor vessel has an inlet and outlet for circulation of a coolant in a heat transfer relationship with a core contained therein that produces heat. The core comprises an array or arrays of fuel assemblies which contain fuel elements. The fuel element is generally a cylindrical metallic sheath sealed at both ends containing nuclear fuel. The nuclear fuel which may be, for example, ceramic fuel pellets of a uranium compound is stacked in the fuel elements. During reactor operation, the nuclear fuel pellets decompose releasing fission products such as fission gas while generating heat in a manner well known in the art. This decomposition of the fuel pellets is sometimes referred to as fuel burnup. The reactor coolant absorbs the heat while circulating through the core thereby cooling the fuel elements of the core and heating the coolant. Of course, the heated coolant may then be used to produce power in a conventional manner.

A common problem associated with these types of fuel elements is high stress levels in the metallic sheath caused by the relatively high external fuel element pressure of the reactor coolant as compared to the internal fuel element pressure. This high pressure difference and resultant high stress levels of the metallic sheath may cause the metallic sheath to rupture thereby releasing fission products into the reactor coolant. Of course, this release of radio-active material into the reactor coolant may cause severe problems and should, therefore, be avoided.

One method of avoiding this problem has been to initially internally pressurize the fuel element with a filling gas. While this initial pressurization reduces the pressure differential across the metallic sheath which thereby reduces the stresses in the sheath at reactor operating conditions, it increases the pressure differential at non-operating conditions. Moreover, as the reactor operates the fuel pellets decompose releasing fission gases while giving off heat. These fission gases which are part of the fission products that must not escape from the fuel elements, mix with the filling gas and increase the internal pressure of the fuel elements so that after a period of reactor operation the internal pressure exceeds the external pressure which results in high stress levels in the metallic sheath. Even where initial internal pressurization is not implemented, the fission products may accumulate to such an extent as to eventually over pressurize the fuel element which again results in high stresses in the metallic sheath. The usual attempted solution to the fission gas build-up problem has been to leave a space for the collection of these fission gases. Merely leaving a space for the fission gases is not totally satisfactory because at least a portion of the fuel element is initially under-pressurized while if a sufficient void is not provided the fuel element may become over-pressurized during operation. In addition, there are several concepts known in the art which attempt to cope with this problem.

In U.S. Pat. No. 3,647,622 — H. N. Andrews et al., issued Mar. 7, 1972 and assigned to the present assignee, there is disclosed a metallic clad sealed fuel element for a nuclear reactor which may be initially pressurized to resist creep collapse in the early stages of burnup and which has one or more normally sealed plenum chambers which are automatically punctured when predetermined increased pressures are reached during burnup to provide void space for fission gases. In a particular example of the Andrews patent the plenum chambers each comprise an elongated bellows-like structure which when compressed by the increasing pressures within the fuel element cause a wall thereof to be punctured by a pin mounted in the bellows-like structure. In the Andrews concept the internal pressure will increase until a puncturable chamber ruptures at which time the internal pressure will decrease to a certain level until further release of fission gases causes the internal pressure to again increase. As can be seen, the Andrews patent describes a method of accommodating increased fission gases within the fuel element, but in a manner that does not provide a relatively constant internal fuel element pressure.

Another method of accommodating fission gases is described in U.S. Pat. No. 3,647,623 — M. B. L. Hepps et al., issued Mar. 7, 1972 and assigned to the present assignee. The Hepps patent describes a metallic clad fuel element for nuclear reactors which has a bellows-like member internally supported therein and in direct fluid contact with both the internal and external environment of the fuel element so as to maintain an internal fuel element pressure substantially equal to the external fuel element pressure during reactor operation. In the Hepps patent, a bellows-like member is attached internally to an end of a fuel element. The end of the fuel element to which the bellows-like member is attached has a hole therein which allows the reactor coolant, which may be water, to enter the bellows-like member. The expansion and contraction of the bellows-like member in response to pressure changes of the reactor coolant thereby changes the internal volume of the fuel element which in turn changes the internal fuel element pressure so that the internal and external fuel element pressures are substantially equal. While the Hepps patent does describe the use of a bellows-like member for substantially reducing pressure differentials across the fuel element, it does so by using the bellows-like member as a partial substitute for the metallic sheath. The bellows-like member, therefore, becomes a part of the primary boundary enclosing the fission products in the fuel element. Of course, the bellows-like member being flexible is not as strong as the metallic sheath which means that the bellows-like member becomes the weakest point of the primary fuel element boundary. Since the ultimate purposes of pressure equalization is to prevent rupture of the primary boundary, which is usually the metallic sheath, and thereby to prevent release of fission products, it may not be advisable to utilize a bellows-like member as a part of the primary boundary.

Another attempted solution of the prior art is described in U.S. Pat. No. 3,291,698 to P. Fortescue, issued Dec. 13, 1966. The Fortescue patent suggests that a portion of the fuel element's metallic sheath be made flexible and that a substance which is chemically compatible with the other components, such as a liquid metal, be placed inside the flexible portion of the fuel element. These flexible portions of the metallic sheath are meant to act as bellows-like members to balance the internal fuel element pressure with the external fuel element pressure while the liquid metal supports the flexible portion against collapse. The Fortescue patent also suggests that a gas may be used in conjunction with a liquid metal in such a manner that when the flexible portion of the sheath is deformed inwardly the gas is compressed to the pressure of the liquid metal thereby making the internal pressure uniform over the section containing the gas and liquid. However, it is to be noted that this fuel element is suggested for a rather low pressure environment of a gas cooled reactor and that this use enables the flexible sheath to be relatively thin in order to act as a bellows. If a material having a low modulus of elasticity were used in the area of the flexible sheaths it might only withstand a few cyclic operations in a high pressure environment. Moreover, such a fuel element would be difficult to laterally support within the grid structures now used in high pressure environments of water cooled nuclear reactors.

SUMMARY OF THE INVENTION

A fuel element for nuclear reactors which has disposed therein a bellows-like member surrounded by a filling gas. The bellows-like member contains a fluid such as water that attains substantially the same temperature as the environment external to the fuel element which is generally the temperature of the reactor coolant. In response to temperature increases of the reactor coolant, the water vaporizes expanding the bellows-like member which compresses the filling gas surrounding the bellows-like member resulting in increased internal fuel element pressure thereby maintaining a relatively small pressure differential across the metallic sheath. Moreover, as the fuel pellets release fission gas into the area of the filling gas, the bellows-like member is compressed, causing some of the water vapor to condense, thus maintaining a relatively constant internal pressure. Therefore, the fuel element internal pressure will be substantially equal to the pressure of the environment external to the fuel element thereby preventing high stress levels in the metallic sheath of the fuel element.

It is an object of this invention to provide a fuel element that has an internal pressure regulating device that is responsive to the reactor coolant temperature.

It is another object of this invention to provide a fuel element with a sealed internal bellows-like member containing a fluid that maintains a substantially constant internal pressure in the presence of accumulating fission products.

It is a more particular object of this invention to provide a fuel element with a sealed internal bellows-like member containing a fluid responsive to the reactor coolant temperature and responsive to the presence of fission products that maintains the internal fuel element pressure substantially equal to the reactor coolant pressure thereby preventing high stress levels in the metallic sheath of the fuel element.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings, wherein:

FIG. 1 is a cross-sectional view of a fuel element embodying the invention as it would appear at the completion of manufacture;

FIG. 2 is a cross-sectional view of a fuel element embodying the invention as it would appear in the reactor at the beginning of reactor operation; and FIG. 3 is a cross-sectional view of a fuel element embodying the invention as it would appear after use in reactor operations.

DESCRIPTION OF THE PREFERRED EMBODIMENT

In designs of nuclear reactors well known in the art, a reactor vessel has an inlet and outlet for circulation of a coolant in a heat transfer relationship with a core supported in the reactor vessel that produces heat. The core comprises an array or arrays of fuel assemblies which comprise an array or arrays of fuel elements. The fuel element is generally a cylindrical metallic sheath sealed at both ends containing nuclear fuel. The nuclear fuel which may be, for example, ceramic fuel pellet of uranium dioxide, is stacked in the fuel element. During reactor operation, the nuclear fuel pellets decompose releasing fission products such as fission gas while generating heat in a manner well known in the art. The reactor coolant, which in a pressurized water reactor is pressurized, absorbs the heat while circulating through the core. The reactor coolant, therefore, exerts an external pressure on the fuel element. In may cases the reactor coolant pressure is greater than the initial internal fuel element pressure which results in high stress levels in the metallic sheath of the fuel element, and may cause failure of the fuel element. The invention herein described provides a means of substantially balancing the internal and external fuel element pressures thereby preventing high stresses in the metallic sheath.

A fuel element 10 in accordance with this invention is shown in FIG. 1. Fuel element 10 comprises pellets 12 of a suitable nuclear fuel, for example uranium dioxide hermetically sealed in a metallic sheath 14 formed from a corrosion resistant material, such as stainless steel or a zirconium alloy. The ends of the sheath 14 are hermetically sealed to end plugs 16 and 18 by means well known in the art such as welds 20. A flexible member which has expansion and contraction characteristics such as bellows member 22 is disposed in cavity 24. Bellows member 22 may be constructed of nickel, stainless steel, or a nickel base alloy and affixed to support 26 by means well known in the art such as welding. Bellows member 22 preferably has a plurality of horizontal convolutions 28 so as to provide bellows member 22 with a wide range of axial movement with respect to fuel element 10. The interior of bellows member 22 contains a fluid 30 such as water that is responsive to temperature changes of the reactor coolant so that as the temperature of the reactor coolant changes fluid 30 will cause bellows member to expand or contract in an appropriate manner as is explained in the operation of the invention. Support 26 which may be attached to sheath 14 has passageways therein (not shown) which allows cavity 24 to be in fluid communication with the section of fuel element 10 that contains pellets 12.

Referring now to FIG. 2, cavity 24 is initially filled with a filling gas 32 such as helium. Because cavity 24 is in fluid communication with the section of fuel element 10 that contains pellets 12, filling gas 32 extends into that section. Cavity 24 is pressurized with filling gas 32 to a predetermined pressure. This predetermined pressure will depend on the particular reactor design but should be chosen such that at initial reactor operation conditions the internal pressure of fuel element 10 is substantially equal to the external fuel element pressure which is generally the pressure of the reactor coolant. In some pressurized water reactors this predetermined pressure may be 1500 p.s.i. This initial pressurization assures that there is little differential pressure across sheath 14 thereby preventing high stress levels in sheath 14 that might be caused by such a pressure differential.

FIG. 2 illustrates the condition of bellows member 22 at initial reactor operating conditions when fluid 30 is a substance such as water. At initial operating conditions, fluid 30 will have attained substantially the same temperature as the reactor coolant and will thus have separated into two phases, the liquid phase 34 and vapor phase 36. Vapor phase 36 causes bellows member 22 to expand axially thereby compressing filling gas 32. It is at this condition that the internal element pressure should be at the predetermined pressure so that it is substantially equal to the external fuel element pressure. The pressure of the liquid vapor mixture will be the vapor pressure of the fluid 30 at that particular temperature.

OPERATION

Referring to FIG. 3, after a period of reactor operation, pellets 12 will have decomposed releasing fission gas 38 such as xenon and krypton. Fission gas 38 combined with filling gas 32 passes through the passageways (not shown) in support 26 into cavity 24. The accumulation of fission gas 38 causes bellows member 22 to contract which causes vapor phase 36 to condense into liquid phase 34 thereby maintaining a substantially constant internal fuel element pressure. Moreover, should the reactor coolant temperature increase, which is usually associated with reactor coolant pressure increases, the temperature of fluid 30 will increase causing more of vapor phase 36 to exist thereby increasing the internal fuel element pressure which generally reduces the stresses in sheath 14 which may be caused by pressure differences across sheath 14. Eventually, the increasing accumulation of fission gas 38 will cause the fluid 30 to be essentially liquid phase 34. Therefore, the particular design of the fuel element should be such that the total accumulation of fission gas 38 will only cause a substantially total condensation of fluid 30 near the end of the fuel element's operating life.

In addition to providing the proper characteristics, bellows member 22 provides a barrier between fluid 30 and sheath 14. When fluid 30 is water or a similar substance, it is not desirable to have the substance in contact with pellets 12 or sheath 14 to avoid corrosion and other problems; therefore, the bellows member 22 serves at least these two purposes.

Fuel elements of the type herein described are designed to operate in present pressurized water reactors under pressures up to at least 2250 p.s.i. during operation. A representative temperature at the center of each pellet 12 is approximately 4200° F with a surface temperature of approximately 1100° F while the sheath 14 may be subjected to temperatures of between 650° F and 850° F during reactor operation. Typically, sheath 14 has an outside diameter of 0.444 inch while the pellets 12 may have a diameter of 0.400 inch. While the embodiment illustrated herein, is particularly adapted to use in pressurized water reactors, it can be seen that the invention may be used in other types of reactors. For example, the invention is well adapted for use in a boiling water reactor because boiling water reactors are not over-pressurized. Since the invention is responsive to reactor coolant temperature changes, the internal pressure of the fuel element will very closely correspond to that of the external fuel element pressure in a boiling water reactor.

While there is described what is now considered to be the preferred embodiment of the invention, it is, of course, understood that various other modifications and variations will occur to those skilled in the art. The claims, therefore, are intended to include all such modifications and variations which fall within the true spirit and scope of the present invention. For example, many different variable volume capsules may be used in place of the bellows member; and the bellows member could be mounted on end plug 16 instead of support 26. Also two or more bellows members could be used together to guard against failure of one such bellows member. In addition, two or more bellows members containing different substances could be used to attain differing pressure characteristics. Furthermore, more than one fluid could be used in the bellows member as may be indicated by the particular use to which it is applied.

We claim:

1. A fuel element for a nuclear reactor comprising:
a sealed generally tubular sheath containing nuclear fuel;
a sealed hollow flexible bellows member disposed entirely within said sheath and capable of deforming in response to pressure changes;
a gas disposed in said sheath surrounding said flexible bellows member for exerting a uniform internal pressure on said sheath; and,
water disposed in said flexible bellows member responsive to the temperature and pressure of the environment in and around said sheath for causing said sealed flexible bellows member to deform thereby maintaining the internal sheath pressure substantially equal to the external sheath pressure.

2. The fuel element recited in claim 1 wherein said fuel embodiment further comprises a gas disposed in said flexible bellows member along with the water.

* * * * *